(No Model.)
G. K. HOFF.
CAR COUPLING.
No. 266,823.  Patented Oct. 31, 1882.
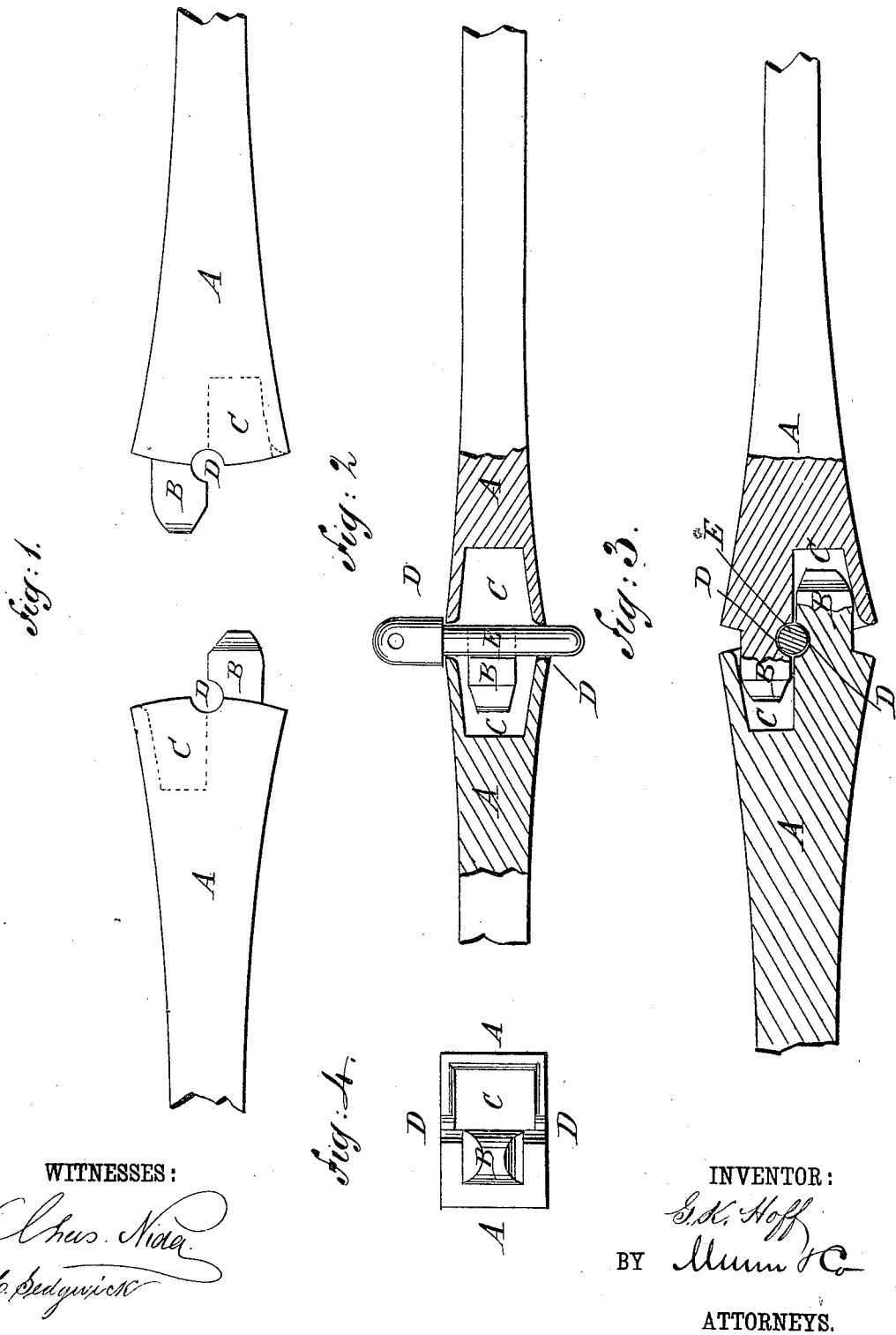
WITNESSES:
Chas. Nida
C. Sedgwick
INVENTOR:
G. K. Hoff
BY Munn & Co.
ATTORNEYS.

UNITED STATES PATENT OFFICE.

GEORGE K. HOFF, OF PHILADELPHIA, PENNSYLVANIA.

CAR-COUPLING.

SPECIFICATION forming part of Letters Patent No. 266,823, dated October 31, 1882.

Application filed August 24, 1882. (No model.)

*To all whom it may concern:*

Be it known that I, GEORGE K. HOFF, of Philadelphia, in the county of Philadelphia and State of Pennsylvania, have invented a new and useful Improvement in Car-Couplings, of which the following is a full, clear, and exact description.

Reference is to be had to the accompanying drawings, forming a part of this specification, in which similar letters of reference indicate corresponding parts in all the figures.

Figure 1 is a plan view of my improvement uncoupled. Fig. 2 is a sectional side elevation of the same coupled. Fig. 3 is a sectional plan of the same coupled. Fig. 4 is a front elevation of one part of the coupling.

The object of this invention is to facilitate the coupling and uncoupling of cars and promote security in the use of car-couplings.

The invention consists in a car-coupling formed of two draw-heads, each made with a bevel-ended projection upon one side of its end, a socket in the other side of its end, and a curved notch partly in its end and partly in the base of the projection, whereby the two draw-heads can be locked together by a coupling-pin, as will be hereinafter fully described.

A represents the draw-heads of the cars, the forward ends of which are rounded, as shown in Fig. 1, so that the said ends can rock upon each other. Upon the end of each draw-head A, near one side, is formed a projection or hook, B, the end of which is beveled upon its four sides, so that it will be guided, as the cars are run together, into the socket C, formed in the end of each draw-head A, near its other side.

In the ends of the draw-heads A and the inner sides of the bases of the projections or hooks B are formed curved notches, D, which, when the two draw-heads come together, form a round hole to receive the coupling-pin E, which serves as a key to lock the parts of the coupling together, and which can be made small, as there is no strain upon it, but only a pressure upon the opposite sides of the same part.

With this construction the parts of the coupling, as the cars are run together, come into proper position to receive the coupling-pin, so that there will be no necessity for an attendant to stand between the cars as they are run together.

Having thus described my invention, I claim as new and desire to secure by Letters Patent—

1. In a car-coupling, the draw-head A, made, substantially as herein shown and described, with a projection, B, having beveled end upon one part of its end, a socket, C, in the other part of its end, and a curved notch partly in its end and partly in the base of the projection, as set forth.

2. In a car-coupling, the combination, with the draw-heads A, having bevel-ended projections B, sockets C, and curved notches D, of the coupling-pin E, substantially as herein shown and described, whereby the said draw-heads will be securely locked together, as set forth.

GEORGE K. HOFF.

Witnesses:
 AMOS C. SHALLCROSS,
 LEWIS SHALLCROSS.